United States Patent [19]

Ito et al.

[11] 4,129,105
[45] Dec. 12, 1978

[54] AIR-TO-FUEL RATIO CONTROL SYSTEM FOR INTERNAL COMBUSTION ENGINES

[75] Inventors: Osamu Ito, Toyota; Nobuhito Hobo, Inuyama; Yutaka Suzuki, Nishio; Itsushi Kawamoto, Chiryu; Takashi Naitou, Kariya; Makoto Shiozaki, Toyota; Yoshimune Konishi, Kariya, all of Japan

[73] Assignee: Nippondenso Co., Ltd., Kariya, Japan

[21] Appl. No.: 809,043

[22] Filed: Jun. 22, 1977

[30] Foreign Application Priority Data

Jun. 29, 1976 [JP] Japan ................................. 51-77261

[51] Int. Cl.² .............................................. F02M 7/00
[52] U.S. Cl. ......................... 123/119 EC; 123/119 D; 123/124 B; 60/276; 60/285
[58] Field of Search ...... 123/119 EC, 32 EE, 32 ED, 123/32 EH, 32 EL, 32 EA, 124 B, 119 D; 60/276, 285

[56] References Cited

U.S. PATENT DOCUMENTS

| | | | |
|---|---|---|---|
| 3,626,915 | 12/1971 | Nakajima | 123/124 B |
| 3,916,170 | 10/1975 | Norimatsu et al. | 123/32 EE |
| 4,020,813 | 5/1977 | Hattori et al. | 60/285 |
| 4,036,186 | 7/1977 | Hattori et al. | 123/119 EC |
| 4,051,672 | 10/1977 | Masaki et al. | 60/285 |
| 4,052,968 | 10/1977 | Hattori et al. | 123/119 EC |
| 4,075,982 | 2/1978 | Asano et al. | 123/119 EC |

*Primary Examiner*—Charles J. Myhre
*Assistant Examiner*—Andrew M. Dolinar
*Attorney, Agent, or Firm*—Cushman, Darby & Cushman

[57] ABSTRACT

A desired function signal is provided by a logical circuit which selects one of a signal corresponding to the speed of a vehicle carrying an internal combustion engine, a signal corresponding to the intake pressure, a signal corresponding to the air-to-fuel ratio of the mixture supplied to the engine, and a signal corresponding to the opening of a throttle valve in accordance with the driving conditions of the vehicle. The amount of additional intake air flowing through an additional intake system provided in the engine is controlled in accordance with the desired function signal, thus providing an air-fuel mixture ratio which suits the driving conditions of the vehicle, the running speed of the vehicle in particular.

9 Claims, 23 Drawing Figures

AIR-TO-FUEL RATIO CONTROL SYSTEM FOR INTERNAL COMBUSTION ENGINES

BACKGROUND OF THE INVENTION

1. Field of the Invention

The present invention relates to an air-to-fuel ratio control system for internal combustion engines, and more particularly the invention relates to such an air-to-fuel ratio control system adapted to electrically control the air-to-fuel ratio of the mixture supplied to the engine in accordance with the driving conditions including the vehicle speed.

2. Description of the Prior Art

In the past, internal combustion engines, especially those used on automobiles and the like have generally employed carburetors and so designed that the mixing ratio or the air-to-fuel ratio of air and fuel mixed in the carburetor is mainly controlled in accordance with only such operating parameters of the engine, e.g., the throttle opening degree and intake air amount. However, in view of the increasing requirements for exhaust emission control and fuel consumption economy in recent years, a great veriety of carburetor air-to-fuel ratio control characteristics have been required, and moreover greater accuracy for air-to-fuel ratio control has been required depending on the automobile driving conditions.

On the other hand, the essential driving requirements of the driver of an automobile carrying an internal combustion engine at least include that the driver can drive the vehicle at any desired speed, and that improved drivability, e.g., improved acceleration performance is ensured. It is evident that these essential requirements of the drivers are all related to the speed of the vehicles. Thus, in view of the fact that the vehicle speed is related with the above-mentioned social needs, i.e., the exhaust emission control and fuel consumption economy, it will be seen that a vehicle speed parameter must be taken into account in controlling the air-fuel ratio of the mixtures. However, the known air-to-fuel ratio control systems for internal combustion engines have not attached great importance to the vehicle speed.

SUMMARY OF THE INVENTION

The present invention has been made in view of these circumstances, and it is the object of this invention to provide an air-to-fuel ratio control system for internal combustion engines wherein additional air is supplied to the portion of the carburetor down-stream of the fuel measuring section thereof in an amount corresponding to a plurality of operating parameters of the engine including at least the vehicle speed, whereby the desired exhaust emission control is accomplished in the lower vehicle speed range, and the desired fuel consumption economy and high power operation are accomplished in the medium and higher vehicle speed ranges.

The system of this invention has among its great advantages the fact that air-fuel mixture can be supplied according to an air-to-fuel ratio pattern which is well suited to the driving conditions to thereby meet various requirements such as improved acceleration performance, fuel consumption economy and exhaust emission control.

DESCRIPTION OF THE PREFERRED EMBODIMENTS

Figure 1:
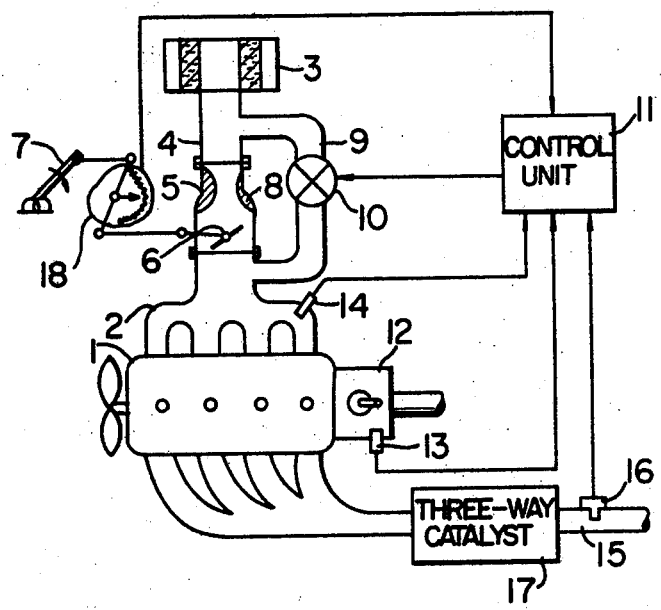
FIG. 1 is a schematic diagram showing the general construction of an embodiment of the present invention.

The present invention will now be described in greater detail with reference to the embodiment shown in FIG. 1. In the Figure, a main intake system 4 communicates an intake manifold 2 and an air cleaner 3 of an internal combustion engine 1 with each other, and air-fuel mixture of a predetermined ratio is supplied to the engine 1 by a carburetor 5 of the main intake system 4. The amount of mixture supplied is adjustable by an accelerator pedal 7 which actuates a throttle valve 6 of the carburetor 5. The upstream side of a venturi 8 or the fuel measuring section of the carburetor 5 is communicated with the downstream side of the throttle valve 6 of the carburetor 5 by an auxiliary intake system 9 including an electromagnetic valve 10, thus making the supply of additional air possible. Numeral 11 designates an electric control circuit for controlling the electromagnetic valve 10, and the control circuit 10 receives a signal from a vehicle speed detector 13 which detects the rotational speed of the output shaft of a transmission 12 of the engine 1 or the speed of the vehicle, a signal from a throttle opening detector 18 which detects the opening degree of the throttle valve 6, a signal from an intake pressure detector 14 positioned in the intake manifold 2, and a signal from an oxygen content detector 16 positioned in an exhaust pipe 15. Numeral 17 designates a three-way catalyst positioned in the exhaust pipe 15 for purifying exhaust gases.

Figure 2:
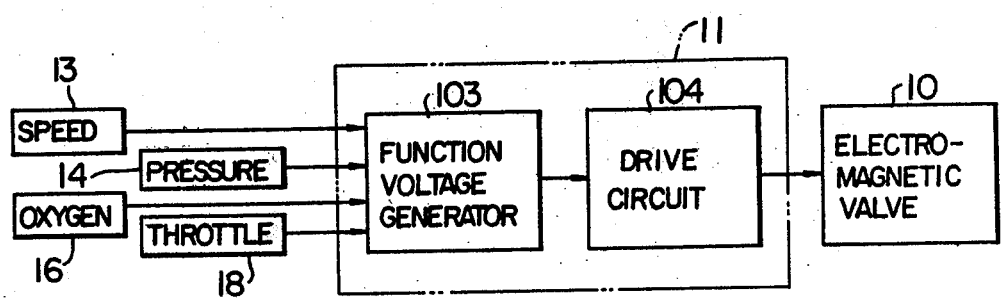
FIG. 2 is a block diagram showing the construction of the electric control unit in the embodiment of FIG. 1.

As shown in FIG. 2, the electric control circuit 11 comprises a function voltage generator 103 for generating a function voltage of a predetermined pattern in response to a plurality of signals from the detectors 13, 14, 16 and 18 which detect the operating parameters of the engine 1, and a drive circuit 104 responsive to the function voltage to control the electromagnetic valve 10.

Figure 3:
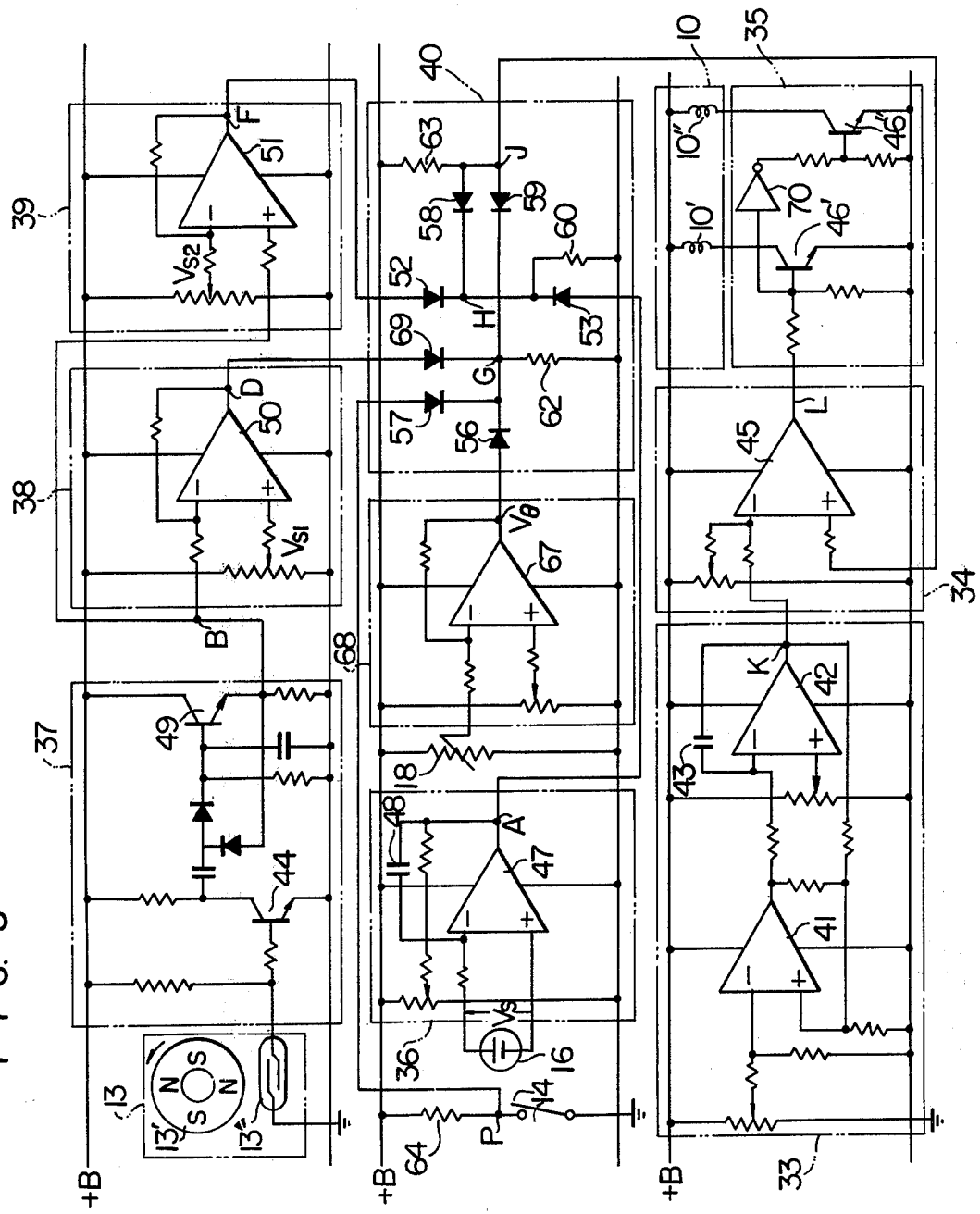
FIG. 3 is a detailed wiring diagram for the block diagram shown in FIG. 2.
Figure 4:
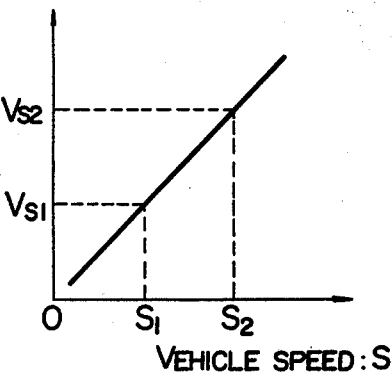
FIG. 4 is a vehicle speed S versus vehicle speed voltage $V_S$ characteristic diagram.
Figure 5:
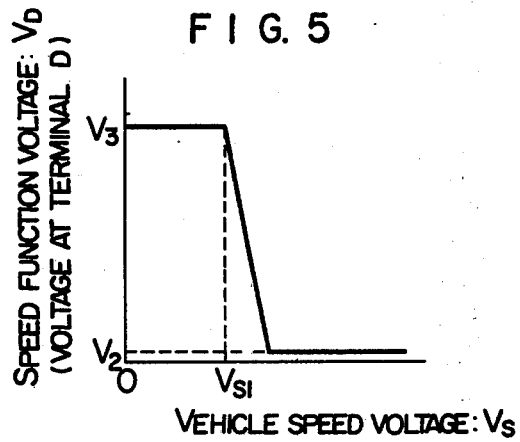
FIGS. 5 and 6 are characteristic diagrams showing the relationship between the vehicle speed voltage $V_S$ and vehicle speed function voltages $V_D$ and $V_F$, respectively.
Figure 6:
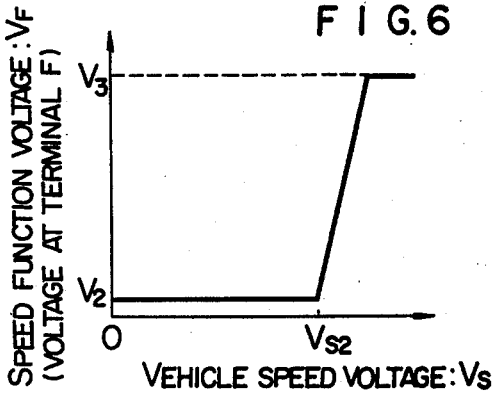

Detailed constructions of the blocks in FIG. 2 are shown in FIG. 3. The vehicle speed detector 13 is designed so that a reed switch 13" is actuated by a rotary magnet 13' operatively associated with the speedometer cable take-off shaft of the vehicle transmission 12 thus producing a vehicle speed pulse signal of a frequency proportional to the vehicle speed, and this pulse signal is subjected to digital-to-analog conversion by a known type of frequency-to-voltage converter 37 comprising transistors 44 and 49, etc., thus producing at a point B a voltage proportional to the vehicle speed or a vehicle speed voltage. This proportional characteristic is shown in FIG. 4, in which the abscissa represents the vehicle speed S (km/h) and the ordinate represents the vehicle speed voltage $V_S$ at the point B. The vehicle speed voltage $V_S$ produced at the point B is applied to two vehicle speed function voltage generators 38 and 39 respectively comprising mainly differential type operational amplifiers 50 and 51. Consequently, vehicle speed function voltages $V_D$ and $V_F$ produced at output points D and F of the vehicle speed function voltage generators 38 and 39 have characteristics as shown in FIGS. 5 and 6, respectively, and in the Figures the abscissas represent the vehicle speed voltage $V_S$ and the ordinates represent the function voltages $V_D$ and $V_F$ produced at the points D and F, respectively.

Figure 7:
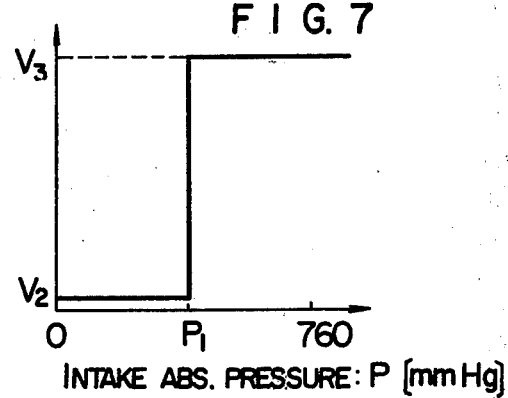
FIG. 7 is an intake manifold pressure P versus intake pressure function voltage $V_P$ characteristic diagram.

The intake pressure detector 14 comprises a pressure switch so designed that its contacts are closed when an intake absolute pressure P is lower than a preset value $P_1$ or $P < P_1$, whereas the contacts are opened when the pressure P becomes higher than the preset value $P_1$ or $P > P_1$, and the detector 14 is connected at a point P to a resistor 64 thus producing a pressure function voltage $V_P$ as shown in FIG. 7. In the Figure, the abscissa P represents the intake manifold absolute pressure (mmHg) and the ordinate $V_P$ represents the pressure function voltage $V_P$ at the point P.

Figure 8:
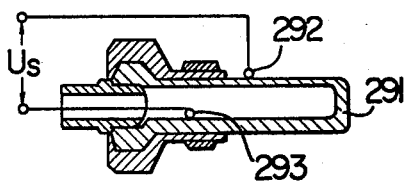
FIG. 8 is a sectional view showing the construction of the oxygen content detector used in the embodiment of FIG. 1.
Figure 9:
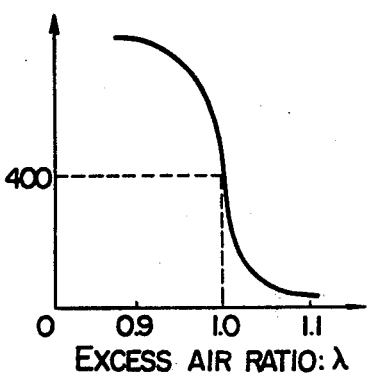
FIG. 9 is a characteristic diagram showing the relationship between excess air ratio $\lambda$ and output voltage $U_S$ of the oxygen content detector.
Figure 10:
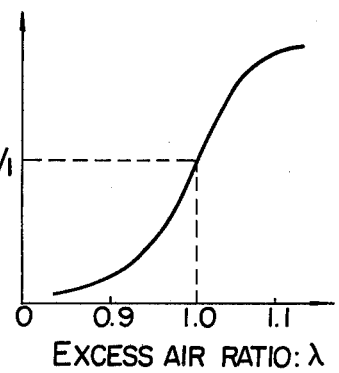
FIG. 10 is an excess air ratio $\lambda$ versus oxygen content function voltage $V_A$ characteristic diagram.

As shown in FIG. 8, the oxygen content detector 16 comprises a sintered zirconia tube 291 having its inner and outer surfaces subjected to platinum surface treatment to produce catalytic action and electrodes 292 and 293, whereby an electromotive force $U_S$ corresponding to the concentration of oxygen in the exhaust gases is produced between the electrodes 292 and 293. The electromotive force characteristic of the oxygen content detector 16 is shown in FIG. 9, in which the abscissa represents the excess air ratio λ and the ordinate represents the electromotive force $U_S$ produced between the electrodes 292 and 293. Where the fuel used is gasoline, the excess air ratio becomes $\lambda = 1$ at the air-to-fuel ratio of about 14.5. The output voltage $U_S$ of the oxygen content detector 16 is applied as an input to an oxygen content function voltage generator 36 comprising a differential type operational amplifier 47, a capacitor 48, etc., thus producing at its output point A an oxygen content function voltage $V_A$ as shown in FIG. 10.

Figure 11:
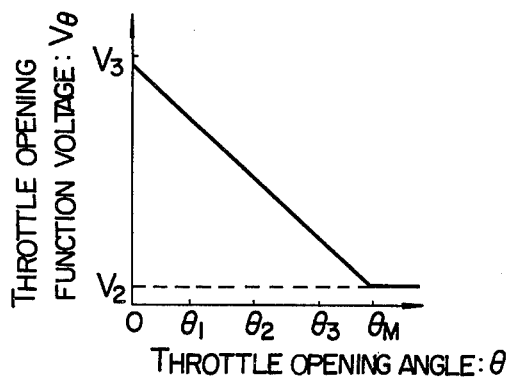
FIG. 11 is a throttle opening $\theta$ versus throttle function voltage $V_\theta$ characteristic diagram.

The throttle opening detector 18 comprises for example a potentiometer, and its output is applied to a throttle opening function voltage generator 68 comprising a differential type operational amplifier 67, etc., thus producing a throttle opening function voltage $V_\theta$ which decreases with increase in the throttle opening θ as shown in FIG. 11.

Figure 12:
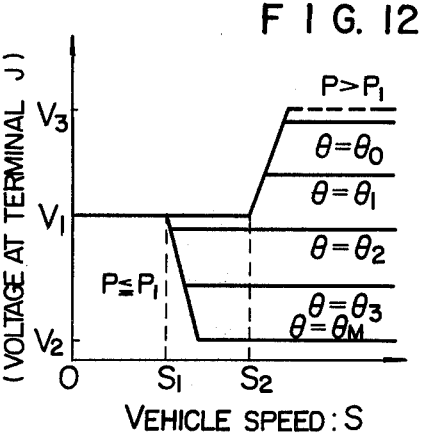
FIG. 12 is a vehicle speed S versus ultimate function voltage $V_J$ characteristic diagram.

These function voltages $V_D$, $V_F$, $V_P$, $V_A$ and $V_\theta$ are applied to a selection circuit 40 which in turn suitably selects one of the applied inputs. In the circuit, diodes 56, 57 and 69 and a resistor 62 constitute an upper level selection circuit whereby the greatest one of the three function voltages $V_D$, $V_P$ and $V_\theta$ is selected to produce a voltage $V_G$ at a poing G. Diodes 52 and 53 and a resistor 60 constitute another upper level selection circuit whereby the greater one of the two function voltages $V_A$ and $V_F$ is selected to produce a voltage $V_H$ at a point H. Diodes 58 and 59 and a resistor 63 constitute a lower level selection circuit whereby the smaller one of the two function voltages $V_G$ and $V_H$ is selected to produce an ultimate function voltage $V_J$ at a point J. As the result of the above-mentioned selection of the function voltages, the pattern of the ultimate function voltage $V_J$ produced at the point J takes a form as shown in FIG. 12, in which the abscissa represents the vehicle speed S. In the Figure, the solid lines indicate the patterns of the function voltage $V_J$ obtained when the intake manifold absolute pressure P is lower than the preset operating value $P_1$ of the pressure switch, and the dotted lines indicate the patterns of the function voltage obtained when $P > P_1$.

In this embodiment, the drive circuit 104 is so designed that a timing pulse voltage is generated at a fixed repetition frequency which is independent of the engine rotational speed, and the time duration of the timing pulse voltage is subjected to pulse-duration modulation in response to a function voltage $V_J$ produced by the function voltage generator 103, thus producing a drive voltage and thereby actuating the electromagnetic valve 10.

Figure 13:
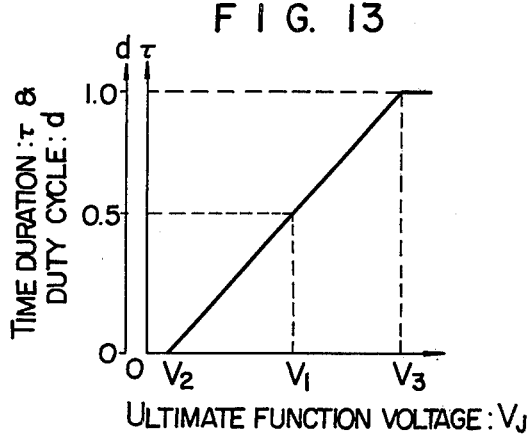
FIG. 13 is a characteristic diagram showing the relationship between the function voltage $V_J$ and timing pulse voltage duration $\gamma$ and duty cycle d, respectively.

The drive circuit 104 will now be described in detail with reference to FIG. 3. In the Figure, numeral 33 designates a sawtooth wave generator in which a differential type operational amplifier 41 constitutes a Schmitt circuit, a differential type operational amplifier 42 and a capacitor 43 constitute an integrator circuit, and the two circuits are connected in a closed loop configuration, thus generating a sawtooth wave voltage of a fixed frequency at a point K. Numeral 34 designates a comparator circuit comprising a differential type operational amplifier 45, etc., and the operational amplifier 45 receives at its inverting input terminal (−) the sawtooth wave voltage generated at the point K and at its noninverting input terminal (+) the output of the function voltage generator 103 or the function voltage $V_J$ from the selection circuit 40. The comparator circuit 34 generates at its output point L a timing pulse voltage having a constant frequency equal to that of the sawtooth wave voltage at the point K and a time duration proportional to the function voltage $V_J$ at the point J. In other words, the sawtooth wave generator 33 and the comparator circuit 34 constitute a pulse-duration modulator whose modulation characteristic is shown in FIG. 13. In the Figure, the abscissa represents the function voltage $V_J$ or modulating voltage and the ordinate represents the time duration $\tau$ of the timing pulse voltage generated at the point L. Since the repetition frequency of the sawtooth wave voltage at the point K is fixed, the repetition frequency of the timing pulse voltage at the point L has a fixed value irrespective of the engine rotational speed. As a result, the relationship between the modulating voltage $V_J$ and the ratio between the time duration $\tau$ and the repetition frequency of the timing pulse voltage or its duty cycle d has a proportional characteristic as shown in FIG. 13. Namely, in the Figure the time duration represented by the ordinate can be regarded as the duty cycle d.

The output of the comparator circuit 34 or the timing pulse voltage is applied to an amplifier circuit 35 and amplified to actuate the electromagnetic valve 10. The sawtooth wave generator 33, the comparator circuit 34 and the amplifier circuit 35 constitute the drive circuit 104. In the amplifier circuit 35, numerals 46' and 46" designate output transistors to which are connected a pair of exciting coils 10' and 10" of the electromagnetic valve 10 as their collector loads. The timing pulse voltage at the point L is applied to the base of the transistor 46', and the timing pulse voltage at the point L is inverted by an inverter 70 into an oppositely phased pulse voltage which in turn is applied to the base of the transistor 46". Consequently, the energizing voltage applied to the exciting coil 10' has the same time duration $\tau$ as the timing pulse voltage, and the duty cycle d of the energizing voltage applied to the exciting coil 10" is given as 1−d in relation to the duty cycle d of the former.

Figure 14:
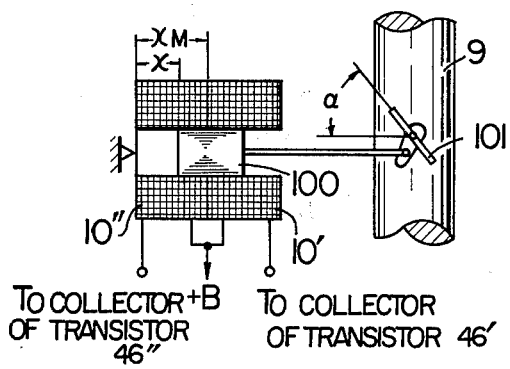
FIG. 14 is a schematic diagram showing the construction of an electromagnetic value used in the embodiment of FIG. 1.
Figure 15:
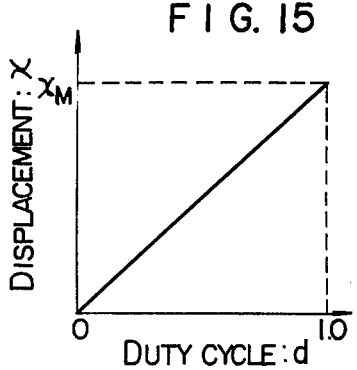
FIG. 15 is a characteristic diagram showing the relationship between the duty cycle d and electromagnetic valve core displacement x.
Figure 16:
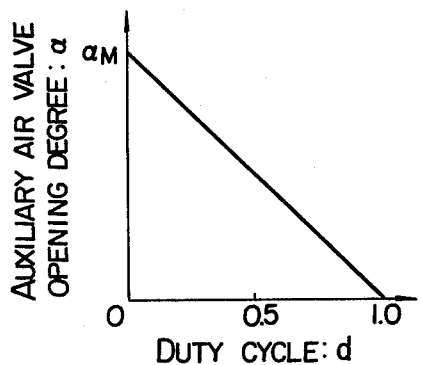
FIG. 16 is a duty cycle d versus electromagnetic valve opening $\alpha$ characteristic diagram.
Figure 17:
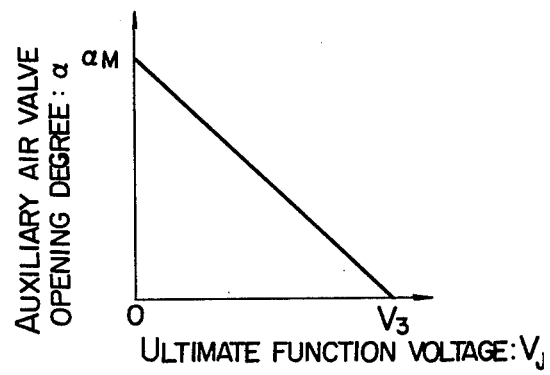
FIG. 17 is a function voltage $V_J$ versus electromagnetic value opening $\alpha$ characteristic diagram.
Figure 18:
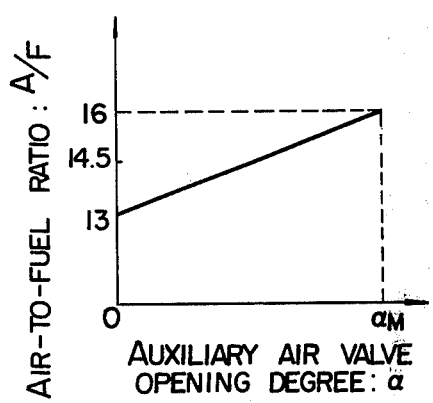
FIG. 18 is an electromagnetic valve opening versus air-to-fuel ratio characteristic diagram.

The electromagnetic valve 10 which is actuated by the drive circuit 104 comprises, as shown in FIG. 14, the exciting coils 10' and 10", an iron core 100 and a valve 101 disposed in the auxiliary intake system 9 and operatively coupled to the iron core 100. The electromagnetic valve 10 is designed so that as shown in FIG. 15, the amount of displacement x of the core 100 increases in proportion to increase in the duty ratio d of the energization of the exciting coil 10', and the opening degree $\alpha$ of the valve 101 decreases with increase in the displacement x. Consequently, as shown in FIG. 16, the opening degree $\alpha$ of the valve 101 decreases with increase in the duty cycle d of the energization of the exciting coil 10', and the amount of additional air supplied through the auxiliary intake system 9 decreases with decrease in the opening degree $\alpha$ of the valve 101. On the other hand, as shown in FIG. 17, the opening degree $\alpha$ of the valve 101 in the auxiliary intake system 9 decreases with increase in the ultimate function voltage $V_J$ from the function voltage generator 103, and thus the function voltage $V_J$ is indicative of the amount of additional air supplied through the auxiliary intake system 9. Assuming now that the carburetor 5 of the main intake system 4 is adjusted to supply a mixture with an air-to-fuel ratio of 13 which is smaller than the stoichiometric ratio of 14.5 and that the opening of the throttle valve 5 is constant, by increasing or decreasing the opening degree $\alpha$ of the valve 101 in the auxiliary intake system 9, the ultimate air-to-fuel ratio can be increased or decreased as compared with the stoichiometric ratio 14.5.

With the construction described above, the overall operation of the system of this invention will now be described. During the vehicle speed S in the range of $S < S_1$, or during relatively low speed driving condition where the vehicle speed is lower than about 50 km/h thus requiring no especially high power output, there is a need to reduce harmful exhaust emissions as far as possible, and thus low pollution driving conditions are contemplated so that the system of this invention operates to select an air-fuel mixture ratio which minimizes harmful exhaust emissions irrespective of the intake manifold absolute pressure P. More specifically, the function voltage $V_A$ related with the oxygen content of exhaust gases is selected as an output voltage $V_J$ of the function voltage generator 103. It is to be noted here that where the amount of additional air is controlled in accordance with the function voltage $V_A$, the amount of additional air from the auxiliary intake system 9 is controlled to control the air-to-fuel ratio by taking the stoichiometric ratio 14.5 (the excess air ratio $\lambda = 1$) as the desired value. The reason is that when the excess air ratio $\xi$ is greater than 1, the function voltage $V_A$ becomes greater than $V_1$, thus decreasing the opening degree $\alpha$ of the valve 101 in the auxiliary intake system 9. When the opening degree $\alpha$ decreases, the excess air ratio $\lambda$ decreases so that the function voltage $V_A$ decreases and approaches $V_1$. On the other hand, when the function voltage $V_A$ is lower than $V_1$, the opening degree $\alpha$ of the valve 101 in the auxiliary intake system 9 is increased so that the function voltage $V_A$ increases and approaches $V_1$. In other words, when the function voltage $V_A$ is selected as the output voltage $V_J$, the output voltage is controlled at $V_1$. As a result, the three-way catalyst 17 can most efficiently reduce the amounts of CO, HC and $NO_x$ in the exhaust gases and thereby limit the air pollutant emissions at sufficiently low values.

When the vehicle speed S is in the range $S_1 < S < S_2$ and the intake manifold pressure P is in the range $P \leq P_1$, the vehicle is in the medium and higher speed steady-state driving ranges involving the medium and higher speeds and requiring little accelerating power, and consequently an economical fuel consumption driving which ensures a minimum fuel consumption is desired. As a result, the function voltage generator 103 generates a voltage $V_J$ which varies according to the patterns shown by the solid lines in FIG. 12. More specifically, when the opening degree $\theta$ of the throttle valve is such that the resulting throttle function voltage $V_\theta$ becomes lower than $V_1$ (e.g., $\theta = \theta_2$, $\theta_3$ or $\theta_M$), the throttle function voltage $V_\theta$ is selected, since the lower one of the function voltages $V_G$ and $V_H$ is selected as the output voltage $V_J$. In this case, the opening $\theta$ of the throttle valve 6 in the carburetor 5 is substantially proportional to the opening degree $\alpha$ of the valve 101 in the auxiliary intake system 9, and consequently the ultimate air-to-fuel ratio of the mixture supplied to the engine 1 is controlled at about 16. As a result, the engine 1 is operated with a mixture having an air-to-fuel ratio which ensures maximum fuel economy. On the other hand, when the vehicle speed S is in the range $S_1 < S < S_2$ but the intake manifold pressure P is in the range $P >$ $P_1$, the vehicle is in the medium speed and high power driving range, thus requiring both the acceleration power and fuel consumption economy. Consequently, medium acceleration performance and economical fuel consumption are contemplated so that the pressure function voltage $V_P$ is selected as a function voltage $V_G$ and the oxygen content function voltage $V_A$ is selected as a function voltage $V_H$. The function voltage generator 103 selects as its output voltage $V_J$ the smaller one of the function voltages $V_H$ and $V_G$, namely, the oxygen content function voltage $V_A$, with the result that as mentioned previously, $V_J = V_1$ in FIG. 12 is provided and the duty cycle becomes 0.5. As a result, the amount of additional air from the auxiliary intake system 9 is controlled in response to the output of the oxygen content detector 16, so that the ultimate air-to-fuel ratio is controlled at the stoichiometric ratio and some accelerating power is provided.

When the vehicle speed S is in the range $S > S_2$ and the intake manifold pressure P is in the range $P > P_1$, the vehicle is in the higher speed and high power driving range, and consequently a high engine power output is desired. Thus, there is a need to decrease the air-to-fuel ratio of the mixture. In this case, according to this embodiment, $V_P$ is selected as a function voltage $V_G$ and $V_F$ is selected as a function voltage $V_H$. Since the voltage value of $V_P$ and $V_F$ is $V_3$, the function voltage generator 103 generates $V_J = V_3$ in FIG. 12 as its output voltage $V_J$, so that the duty cycle d becomes 1.0 according to FIG. 13, and no additional air is supplied from the auxiliary intake system 9, thus controlling the air-to-fuel ratio of the mixture at about 13 and thereby providing a high power output.

Figure 19:
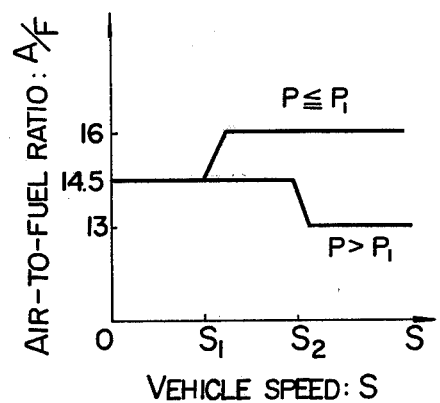
FIG. 19 is a vehicle speed $V_S$ versus air-to-fuel ratio characteristic diagram.

The change of the air-to-fuel ratio patterns of the mixture according to the above-mentioned operations is shown in FIG. 19, in which the ordinate represents the air-to-fuel ratio of the mixtures drawn into the engine, the intake manifold pressure P is used as a parameter, and the abscissa represents the vehicle speed S. In this way, various air-to-fuel ratio patterns can be realized to suit various driving conditions.

While, in the above described embodiment, among the engine operating parameters used, the vehicle speed and intake manifold pressure are utilized as main control parameters and the throttle opening degree and the exhaust gas oxygen content are used as auxiliary control parameters, it is possible to provide other detectors which detect the amount of air drawn into the engine, engine rotational speed, engine temperature, atmospheric pressure, etc., and use these parameters as additional main control parameters or auxiliary control parameters, thereby determining with greater accuracy a desired value of the air-to-fuel ratio to suit the driving conditions.

Figure 20:
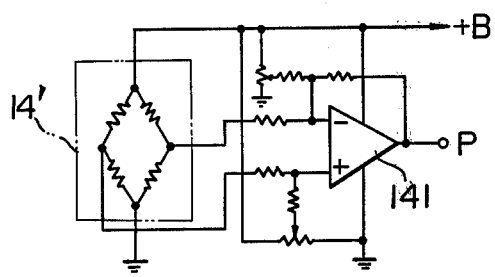
FIG. 20 is a wiring diagram showing a modification of the intake pressure function voltage generator.
Figure 21:
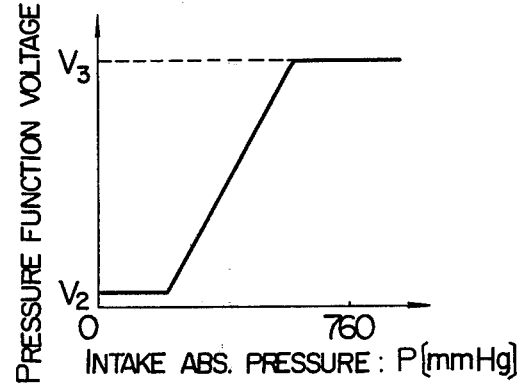
FIG. 21 is a characteristic diagram showing the relationship between the intake manifold pressure P and the intake pressure function voltage $V_F$ from the intake pressure function voltage generator shown in FIG. 20.
Figure 22:
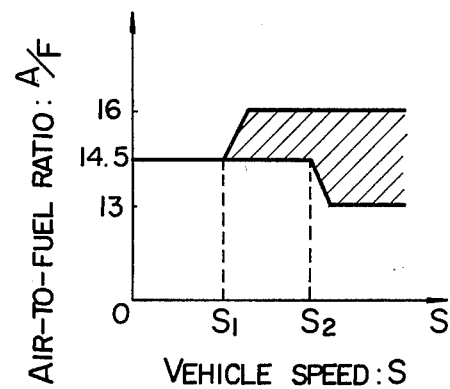
FIG. 22 is a vehicle speed $V_S$ versus air-to-fuel ratio characteristic diagram obtained with the intake pressure function voltage generator shown in FIG. 20.

Further, while the intake pressure detector 14 comprises a pressure switch which changes from its closed position to its open position at the preset pressure $P_1$, any known type of semiconductor pressure transducer may for example be employed to continuously detect the pressure in the intake manifold. More specifically, as shown in FIG. 20, a pressure function voltage generator may be provided with a semiconductor pressure detector 14', a differential type operational amplifier 141, etc., so as to generate a pressure function voltage $V_P$ which continuously varies with the intake manifold pressure. The characteristic diagram of FIG. 21 shows the relationship between the intake manifold pressure P and the pressure function voltage $V_P$. Since the pressure function voltage $V_P$ changes continuously from the lowest value $V_2$ to the highest value $V_3$, the use of this detector in the above-mentioned embodiment makes it possible to accomplish more accurate and fine control of the air-to-fuel ratio within the hatched region in FIG. 22.

Figure 23:
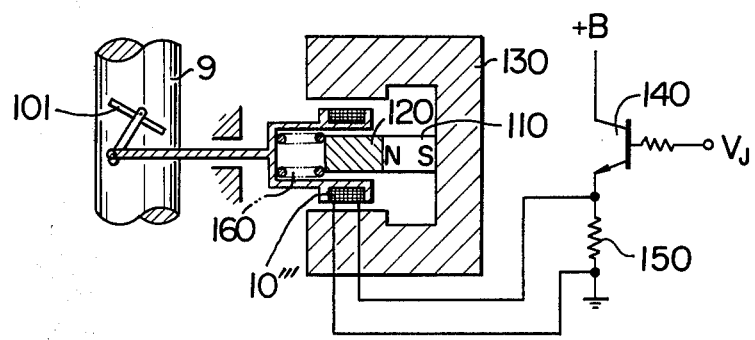
FIG. 23 is a schematic diagram showing a modification of the electromagnetic valve 10.

Further, the electromagnetic valve 10 may be of the movable coil type as shown in FIG. 23. More specifically, the electromagnetic valve 10 comprises a movable coil 10''' disposed in the air gap of a magnetic path formed by a permanent magnet 110 and yokes 120 and 130, whereby the actuating force produced in the movable coil 10''' is transmitted by way of a linkage to the valve 101 in the auxiliary intake system 9, thus controlling the amount of additional air flowing through the auxiliary intake system 9 and thereby controlling the air-to-fuel ratio of the mixtures. In this case, the movable coil 10''' is connected to the ends of an emitter resistor 150 of a transistor 140 connected in emitter follower configuration, and the base of the transistor 140 is connected to the function voltage generating terminal J of the function voltage generator 103. With this construction, energizing current flows in the movable coil 10''' in proportion to the function voltage $V_J$, so that the movable coil 10''' is moved against a spring 160, thus operating the valve 101 in the auxiliary intake system 9 and thereby controlling the air-to-fuel ratio of the mixture.

What is claimed is:

1. An air-to-fuel ratio control system for internal combustion engines comprising:

a carburetor, positioned upstream of an engine of a vehicle and having a throttle valve therein, for supplying said engine with air-fuel mixture corresponding to the opening angle of said throttle valve;

a speed detector for generating a speed voltage indicative of the speed of said vehicle;

a pressure detector, provided in an intake passage connecting said carburetor with said engine, for generating a pressure voltage indicative of the pressure in said intake passage;

an oxygen detector, provided in the exhaust passage of said engine, for generating an oxygen voltage indicative of the air-to-fuel ratio of the mixture supplied to said engine;

a speed function generator, connected to be responsive to said speed voltage, for generating a speed function voltage the level of which is constant while the speed of said vehicle is lower than a lower preset speed and is higher than a higher preset speed;

a pressure function generator, connected to be responsive to said pressure voltage, for generating a pressure function voltage which varies in accordance with the pressure in said intake passage;

an oxygen function generator, connected to be responsive to said oxygen voltage, for generating an oxygen function voltage which varies in accordance with the air-to-fuel ratio of said mixture;

a selection circuit, adapted to select one of said pressure function voltage and said oxygen function voltage in response to the level of said speed function voltage, said selection circuit selecting said oxygen function voltage while the speed of said vehicle is lower than said lower preset speed and said pressure function voltage while the speed of said vehicle is higher than said higher preset speed; and an air addition passage, positioned to by-pass said carburetor and connected to be responsive to the function voltage selected by said selection circuit, for supplying said engine with air to thereby control the air-to-fuel ratio of said mixture in response to the speed of said vehicle, the amount of said air being controlled by said oxygen function voltage and said pressure function voltage while the speed of said vehicle is lower and higher than said respective lower preset speed and higher preset speed, respectively.

2. An air-to-fuel ratio control system as set forth in claim 1 further comprising:
   a throttle position detector, coupled to said throttle valve, for generating a throttle voltage indicative of the opening angle of said throttle valve; and
   a throttle function generator, connected to be responsive to said throttle voltage, for generating a throttle function voltage which varies in accordance with the opening angle of said throttle valve, said throttle function voltage being selected by said selection circuit to control the amount of air supplied from said air addition passage while the speed of said vehicle is higher than said lower preset speed.

3. An air-to-fuel ratio control system as set forth in claim 1 further comprising:
   a pulse generator, connected to said selection circuit, for generating a pulse signal having a fixed frequency and a time duration varying in response to the voltage selected by said selection circuit; and
   electromagnetic valve means, coupled to said air addition passage to be responsive to said pulse signal, for controlling the amount of air supplied from said air addition passage in accordance with the time duration of said pulse signal.

4. An air-to-fuel ratio control system as set forth in claim 1, wherein said pressure detector includes a pressure sensitive semiconductor for generating said pressure voltage varying substantially linearly in accordance with the variation of the pressure in said intake passage, and wherein said pressure function generator includes an operational amplifier connected to said semiconductor, and responsive to said pressure voltage for generating said pressure function voltage which increases as the pressure in said intake passage increases.

5. An air-to-fuel ratio control system as set forth in claim 3, wherein said pulse generator includes:
   a sawtooth wave generator for generating a sawtooth wave having a fixed frequency; and
   a comparator connected to said sawtooth wave generator and said selection circuit, for comparing said sawtooth wave with the voltage selected by said selection circuit to generate said pulse signal.

6. An air-to-fuel ratio control system as set forth in claim 1, further comprising electromagnetic valve means coupled to said air addition passage and including:
   an auxiliary valve disposed in said air addition passage, for controlling the amount of air flowing through said air addition passage;
   magnetic path forming means having a permanent magnet;
   moving coil means coupled to said auxiliary valve and having a coil disposed in an air gap of said magnetic path forming means and connected to said selection circuit, said moving coil means moving in one direction to close said auxiliary valve when said coil is energized by the voltage selected by said selection circuit; and
   spring means connected to said magnetic path forming means and said moving coil means, for biasing said moving coil means in the other direction to open said auxiliary valve, the opening angle of said auxiliary valve being decreased as the function voltage selected by said selection circuit is increased.

7. An air-to-fuel ratio control system as set forth in claim 6, further comprising an emitter-follower transistor circuit connected between said selection circuit and the coil of said moving coil means, and including:
   a transistor connected to be responsive to the voltage selected by said selection circuit; and
   an emitter resistor connected to an emitter electrode of said transistor and the coil of said moving coil means.

8. An air-to-fuel ratio control system for internal combustion engines comprising:
   a carburetor, positioned in an intake passage of an engine of a vehicle and having a throttle valve, for supplying said engine with air-fuel mixture corresponding to the opening angle of said throttle valve;
   a speed detector for generating a speed signal indicative of the vehicle speed;
   an air-to-fuel ratio detector, provided in the exhaust passage of said engine, for generating a ratio signal indicative of the air-to-fuel ratio of said mixture supplied to said engine;
   a pressure detector, provided in said intake passage, for generating a pressure signal indicative of the pressure in said intake passage;
   a function signal generator, connected to said detectors, for generating a function signal which corresponds to said ratio signal during a predetermined lower vehicle speed range, to one of said ratio and pressure signals during a predetermined medium vehicle speed range, and to said pressure signal during a predetermined higher vehicle speed range; and
   an auxiliary intake passage, provided to supply the air into said intake passage at the downstream of said carburetor, for controlling the air-to-fuel ratio of said mixture in response to said function signal, whereby the air-to-fuel ratio of said mixture is switched in response to said speed of said vehicle.

9. An air-to-fuel ratio control system as set forth in claim 8 further comprising:
   a pulse generator, connected to said function signal generator, for generating a pulse signal having a fixed frequency and a time duration varying in response to the function signal generated by said function signal generator; and
   electromagnetic valve means, coupled to said auxiliary intake passage to be responsive to said pulse signal, for controlling the amount of air supplied from said auxiliary intake passage in accordance with the time duration of said pulse signal.

* * * * *